Sept. 4, 1923.
L. A. HANSON
SIDE WING FOR WINDSHIELDS
Filed May 18, 1921
1,466,713
2 Sheets-Sheet 1
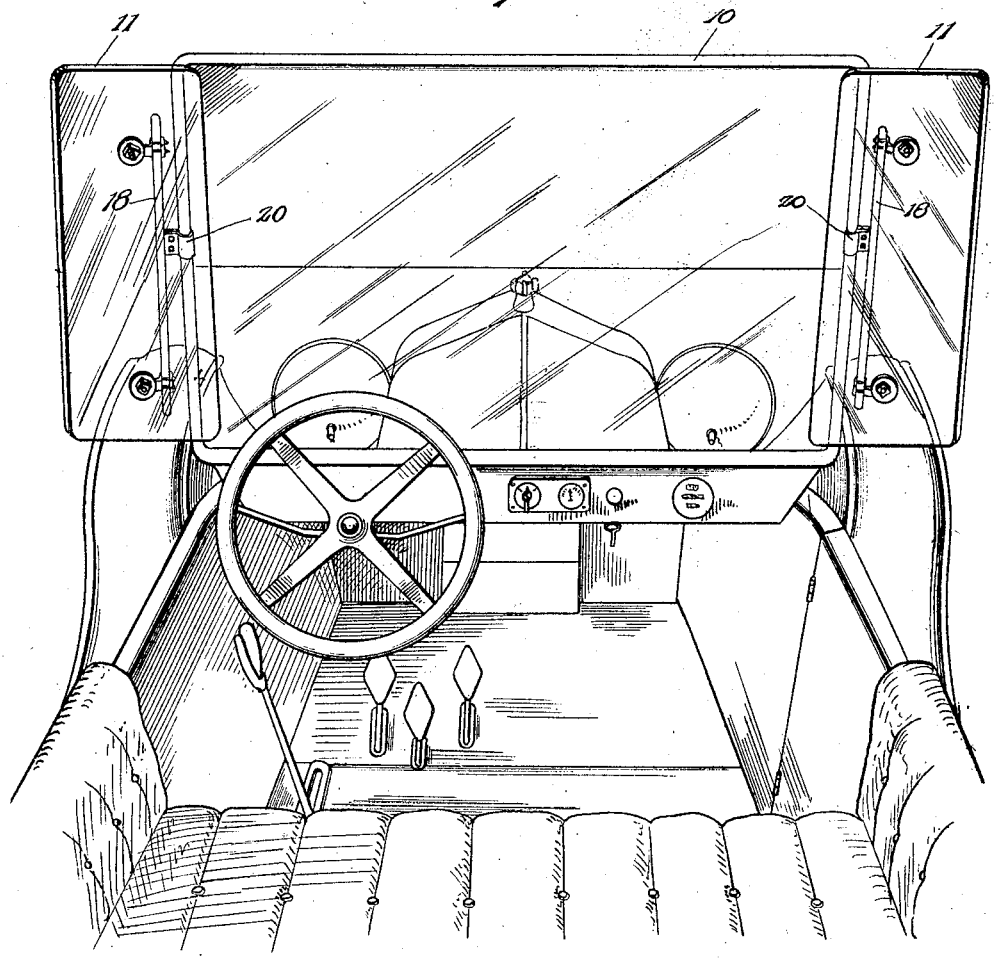
Inventor
L. A. Hanson.
By Lacey & Lacey, Attorneys

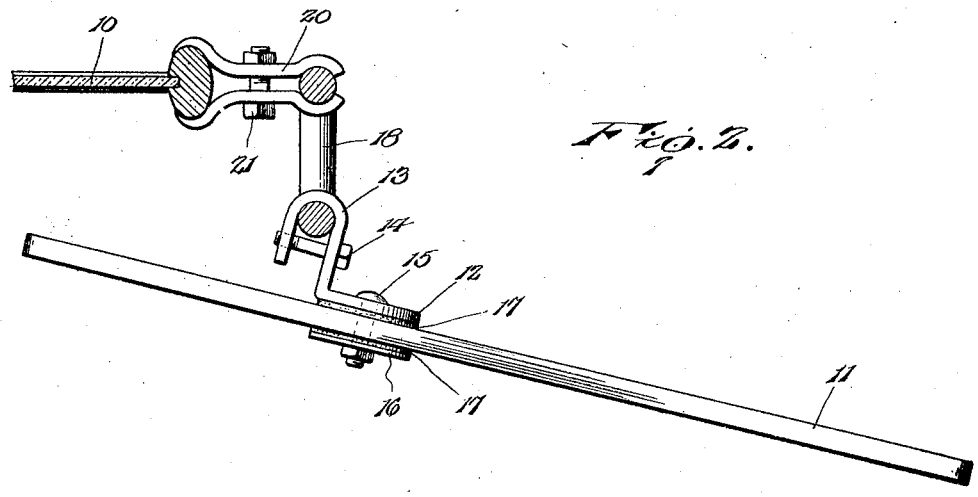
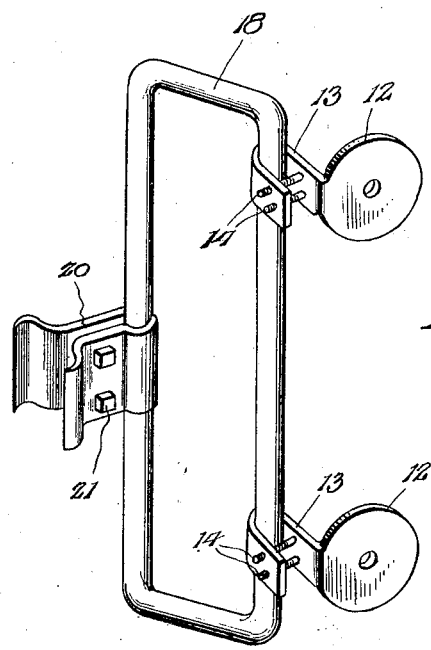

Patented Sept. 4, 1923.

1,466,713

UNITED STATES PATENT OFFICE.

LENNIE A. HANSON, OF KIRKLAND, WASHINGTON.

SIDE WING FOR WINDSHIELDS.

Application filed May 18, 1921. Serial No. 470,692.

*To all whom it may concern:*

Be it known that I, LENNIE A. HANSON, a citizen of the United States, residing at Kirkland, in the county of King and State of Washington, have invented certain new and useful Improvements in Side Wings for Windshields, of which the following is a specification.

This invention relates to an improved side wing for motor vehicle wind shields and has as one of its principal objects to provide a device of this character which will successfully combine extreme structural simplicity with entire efficiency in practical use.

The invention has as a further object to provide a device wherein the deflector employed may be adjusted vertically and may also be adjustably swung horizontally.

And the invention has a still further object to provide a device which may be readily applied and which may be employed in connection with wind shields of motor vehicles of practically any conventional design.

Other and incidental objects will appear hereinafter.

In the drawings:

Figure 1 is a fragmentary perspective view showing the wind shield of a motor vehicle of conventional design equipped with a pair of my improved wings, Figure 2 is a transverse sectional view particularly bringing out the manner in which the device is connected to the wind shield, and Figure 3 is a perspective view showing the supporting bracket of the device in detail.

Referring now more particularly to the drawings, I have, for convenience, shown my improved device in connection with a motor vehicle of conventional design. The wind shield of the vehicle is indicated at 10 and, as suggested in Figure 1, one of the devices is mounted at each side of the wind shield for diverting air currents or flying particles away from the occupants of the vehicle. In carrying the invention into effect, I employ an oblong deflector or plate 11 which is preferably formed of glass and connected to said deflector are clamps 12. These clamps are, as particularly shown in Figure 3 of the drawings, preferably provided with annular heads from which extend at substantially right angles thereto resilient U-shaped clamp members 13. Freely fitted through the inner side of each of said members and threaded through the outer side thereof are transversely disposed clamping bolts 14. The clamps are mounted near the ends of the plate 11 and extending through the heads of said clamps and through the plate are bolts 15 securing the clamps thereto. Washers 16 are employed to coact with the nuts of said bolts and arranged beneath said washers as well as beneath the heads of the clamps are preferably rubber gaskets 17 resting against opposite sides of the plate.

Coacting with the clamps is an oblong bracket link 18. As will be observed, the clamp members 13 of the clamps 12 are arranged to embrace one side of the link, being held to grip the link by the bolts 14. These bolts may, of course, be adjusted to secure the desired tension upon the clamp members and in this connection it is to be observed that said bolts will prevent accidental disengagement of the clamps from the link. Coacting with the opposite side of the link is a double ended attaching clamp 20. This clamp is formed of companion clamp members adjustably connected by a plurality of bolts 21, corresponding ends of said members being formed to embrace the adjacent side of the link while opposite corresponding ends of said members are, as particularly shown in Figure 2 formed to embrace an end post or frame element of the wind shield 10. Consequently, by tightening the bolts 21, the clamp members will be caused to grip the wind shield post for securing the device thereon as well as also grip the link 18.

Referring now particularly to Figure 1 of the drawings, it will be seen that the deflector plates of the pair of side wings upon the wind shield may be arranged to extend laterally outward from the ends of the wind shield at an inclination thereto. By releasing the clamp members 13 slightly, the position of said plates with respect to the links 18 may be adjusted and by rotating said links upon the clamps 20, the plates may be adjustably swung either forwardly or backwardly. Furthermore, by slightly releasing the clamps 20, the links 18 may be shifted longitudinally upon the clamps and the plates thus adjusted vertically. I accordingly provide a device of highly effective design and, as will now be appreciated, a device which may be readily applied and easily adjusted to suit the desires of the user.

Having thus described the invention, what is claimed as new is:

1. In a side wing for wind shields, the combination of an endless supporting link having oppositely disposed sides, a deflector plate, means connecting the plate with one side of the link for adjustment therealong, and means for connecting the link with a vehicle and adjustable along the opposite side of the link.

2. A side wing for wind shields including a supporting link having sides and ends, a deflector plate, means connecting the plate with one side of the link, and means engaging the opposite side of the link for connecting the link with a vehicle, the link being endless whereby the sides and ends of the link will be held against spreading as well as individual vibration.

In testimony whereof I affix my signature.

LENNIE A. HANSON. [L. S.]